United States Patent
Suzuki et al.

(10) Patent No.: US 11,594,717 B2
(45) Date of Patent: Feb. 28, 2023

(54) ALL-SOLID LITHIUM SECONDARY BATTERY, MANUFACTURING METHOD THEREOF, METHOD OF USE THEREOF, AND CHARGING METHOD THEREOF

(71) Applicant: Samsung Electronics Co., Ltd., Suwon-si (KR)

(72) Inventors: Naoki Suzuki, Kanagawa-ken (JP); Nobuyoshi Yashiro, Kanagawa-ken (JP); Yuichi Aihara, Kanagawa-ken (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 413 days.

(21) Appl. No.: 16/829,349

(22) Filed: Mar. 25, 2020

(65) Prior Publication Data

US 2020/0313164 A1    Oct. 1, 2020

(30) Foreign Application Priority Data

Mar. 29, 2019  (JP) .............................. JP2019-066886
Aug. 9, 2019   (KR) ........................ 10-2019-0097639
(Continued)

(51) Int. Cl.
*H01M 10/0562*    (2010.01)
*H01M 4/133*      (2010.01)
(Continued)

(52) U.S. Cl.
CPC ........... *H01M 4/133* (2013.01); *H01M 4/134* (2013.01); *H01M 4/364* (2013.01); *H01M 4/38* (2013.01);
(Continued)

(58) Field of Classification Search
CPC ... H01M 2300/0065; H01M 2004/027; H01M 10/0562; H01M 4/364; H01M 4/133;
(Continued)

(56) References Cited

U.S. PATENT DOCUMENTS

| 8,257,858 B2    | 9/2012 | Kashiwagi    |
| 2004/0023116 A1 | 2/2004 | Fujino et al.|

(Continued)

FOREIGN PATENT DOCUMENTS

| JP | S63-285872 A  | 11/1988 |
| JP | 1999-514491 A | 12/1999 |

(Continued)

OTHER PUBLICATIONS

Suzuki et al., "Synthesis and Electrochemical Properties of I4-Type Li1+2xZn1-xPS4 Solid Electrolyte", Chemistry of Materials, 30, 2018, 2236-2244.

(Continued)

*Primary Examiner* — Yoshitoshi Takeuchi
(74) *Attorney, Agent, or Firm* — Cantor Colburn LLP

(57) ABSTRACT

An all-solid lithium secondary battery, including: a cathode including a cathode active material layer, a solid electrolyte layer; and an anode including an anode active material layer, which forms an alloy or a compound with lithium, wherein the cathode, the solid electrolyte is between the cathode and the anode, wherein the anode active material layer includes about 33 weight percent to about 95 weight percent of an amorphous carbon with respect to the total mass of an anode active material in the anode active material layer, and a ratio (Continued)

of the initial charge capacity of the cathode active material layer to the initial charge capacity of the anode active material layer satisfies $0.01<b/a<0.5$, wherein a is the initial charge capacity of the cathode active material layer, and b is the initial charge capacity of the anode active material layer.

34 Claims, 4 Drawing Sheets

(30) Foreign Application Priority Data

Jan. 30, 2020 (JP) .............................. JP2020-013978
Mar. 3, 2020 (KR) ........................ 10-2020-0026308

(51) Int. Cl.

| | | |
|---|---|---|
| *H01M 4/587* | (2010.01) | |
| *H01M 4/583* | (2010.01) | |
| *H01M 4/134* | (2010.01) | |
| *H01M 4/38* | (2006.01) | |
| *H01M 10/052* | (2010.01) | |
| *H01M 10/0585* | (2010.01) | |
| *H01M 4/36* | (2006.01) | |
| *H01M 4/02* | (2006.01) | |

(52) U.S. Cl.
CPC ......... *H01M 4/587* (2013.01); *H01M 10/052* (2013.01); *H01M 10/0562* (2013.01); *H01M 10/0585* (2013.01); *H01M 2004/027* (2013.01); *H01M 2300/008* (2013.01)

(58) Field of Classification Search
CPC ...... H01M 4/587; H01M 4/583; H01M 4/134; H01M 4/38
See application file for complete search history.

(56) References Cited

U.S. PATENT DOCUMENTS

| | | |
|---|---|---|
| 2013/0084499 A1 | 4/2013 | Yanagita et al. |
| 2019/0051933 A1 | 2/2019 | Li et al. |
| 2019/0157723 A1 | 5/2019 | Suzuki et al. |
| 2019/0312257 A1* | 10/2019 | Ishiwatari ............... H01M 4/62 |

FOREIGN PATENT DOCUMENTS

| | | | |
|---|---|---|---|
| JP | 2003-346907 A | 12/2003 | |
| JP | 2008-091041 A | 4/2008 | |
| JP | 2008-117574 A | 5/2008 | |
| JP | 4228593 B2 | 12/2008 | |
| JP | 2011-086554 A | 4/2011 | |
| JP | 2013-84566 A | 5/2013 | |
| JP | 2019033053 A | 2/2019 | |
| JP | 2019-036537 A | 3/2019 | |
| JP | 2019-096610 A | 6/2019 | |
| WO | 1997016860 A1 | 5/1997 | |
| WO | 2015146315 A1 | 10/2015 | |
| WO | WO-2018097213 A1 * | 5/2018 | .......... H01M 10/052 |

OTHER PUBLICATIONS

Takei et al., "Effects of the macroscopic structure of carbon black on its behaviour as the anode in a lithium secondary cell", Journal of Power Sources, 55, 1995, 191-195.

* cited by examiner

ALL-SOLID LITHIUM SECONDARY BATTERY, MANUFACTURING METHOD THEREOF, METHOD OF USE THEREOF, AND CHARGING METHOD THEREOF

CROSS-REFERENCE TO RELATED APPLICATIONS

This application claims priority to and the benefit of Japanese Patent Application No. 2019-066886, filed on Mar. 29, 2019, in the Japan Patent Office, Japanese Patent Application No. 2020-013978, filed on Jan. 30, 2020, in the Japan Patent Office, Korean Patent Application No. 10-2019-0097639, filed on Aug. 9, 2019, in the Korean Intellectual Property Office, and Korean Patent Application No. 10-2020-0026308, filed on Mar. 3, 2020, in the Korean Intellectual Property Office, the contents of each of which are incorporated herein by reference in their entirety.

BACKGROUND

1. Field

The present disclosure relates to an all-solid lithium secondary battery, a method of manufacturing the same, a method of using the same, and a method of charging the same.

2. Description of Related Art

An all-solid secondary battery, which includes a solid electrolyte, has been developed. To increase the energy density of an all-solid secondary battery, the use of lithium as an anode active material has been suggested.

The capacity density (capacity per unit volume) of lithium is about 10 times the capacity density of graphite, which is used as an anode active material. Accordingly, by using lithium as an anode active material, it may be possible to make an all-solid secondary battery thinner and to increase the output thereof.

However, there are disadvantages to using lithium as an anode active material, and improvements in an all-solid secondary battery which uses lithium as an anode active material, are desired.

SUMMARY

Provided herein is an all-solid secondary battery having excellent battery characteristics, particularly both excellent cycle characteristics and excellent discharge rate characteristics, and a method of charging the same.

Additional aspects will be set forth in part in the description which follows and, in part, will be apparent from the description, or may be learned by practice of the presented embodiments of the disclosure.

According to an aspect of the disclosure, there is provided an all-solid lithium secondary battery including: a cathode including a cathode active material layer; a solid electrolyte; and an anode including an anode active material layer, which forms an alloy or compound with lithium, wherein the solid electrolyte is between the cathode and the anode, wherein the anode active material layer includes about 33 weight percent (weight %) to about 95 weight % of an amorphous carbon, with respect to a total mass of an anode active material in the anode active material layer, wherein the amorphous carbon has a nitrogen adsorption specific surface area of greater than 0 square meters per gram ($m^2/g$) to about 100 square meters per gram,
a dibutyl phthalate (DBP) oil absorption of about 150 milliliters per about 100 grams (mL/100 g) to about to about 400 milliliters per 100 grams, or a combination thereof, and
wherein a ratio of an initial charge capacity of the cathode active material layer to an initial charge capacity of the anode active material layer satisfies Inequality 1, $$0.01 < b/a < 0.5 \qquad \text{Inequality 1}$$

wherein a is the initial charge capacity (milliampere hours, mAh) of the cathode active material layer, and b is the initial charge capacity (mAh) of the anode active material layer.

In an embodiment, in the all-solid secondary battery, the amorphous carbon may have a nitrogen adsorption specific surface area of about 20 $m^2/g$ to about 100 $m^2/g$.

In an embodiment, in the all-solid secondary battery, the amorphous carbon may have a nitrogen adsorption specific surface area of about 30 $m^2/g$ to about 100 $m^2/g$.

In an embodiment, in the all-solid secondary battery, the amorphous carbon may have a DBP oil absorption of about 150 mL/100 g to about 400 mL/100 g.

In an embodiment, in the all-solid secondary battery, the amorphous carbon may have a DBP oil absorption of about 200 mL/100 g.

In an embodiment, in the all-solid secondary battery, the anode active material layer may further include gold, platinum, palladium, silicon, silver, aluminum, bismuth, tin, indium, zinc, or a combination thereof.

In an embodiment, in the all-solid secondary battery, the anode active material layer may include about 45 weight % to about 95 weight % of the amorphous carbon with respect to the total mass of the anode active material.

In one or more embodiments, in the all-solid secondary battery, the amorphous carbon may be carbon black.

In an embodiment, in all-solid secondary battery, the carbon black may be at furnace black, acetylene black, ketjen black, or a combination thereof.

According to an aspect of the disclosure, there is provided a method of manufacturing the all-solid lithium secondary battery, the method including: providing a solid electrolyte between the cathode and the anode; pressing the cathode, the solid electrolyte, and the anode to manufacture the all-solid lithium secondary battery.

According to an aspect of the disclosure, there is provided a method of using the all-solid lithium secondary battery, the method including: charging and discharging the all-solid lithium secondary battery, while pressing the all-solid lithium secondary battery between two plates.

According to yet another aspect of the disclosure, there is provided a method of charging an all-solid lithium secondary battery, the method including: charging the all-solid lithium secondary battery such that an amount of the charge of the all-solid lithium secondary battery exceeds an initial charge capacity of the anode active material layer.

In an embodiment, in the method of charging the all-solid secondary battery, the amount of the charge is about two times to about 100 times the initial charge capacity of the anode active material layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
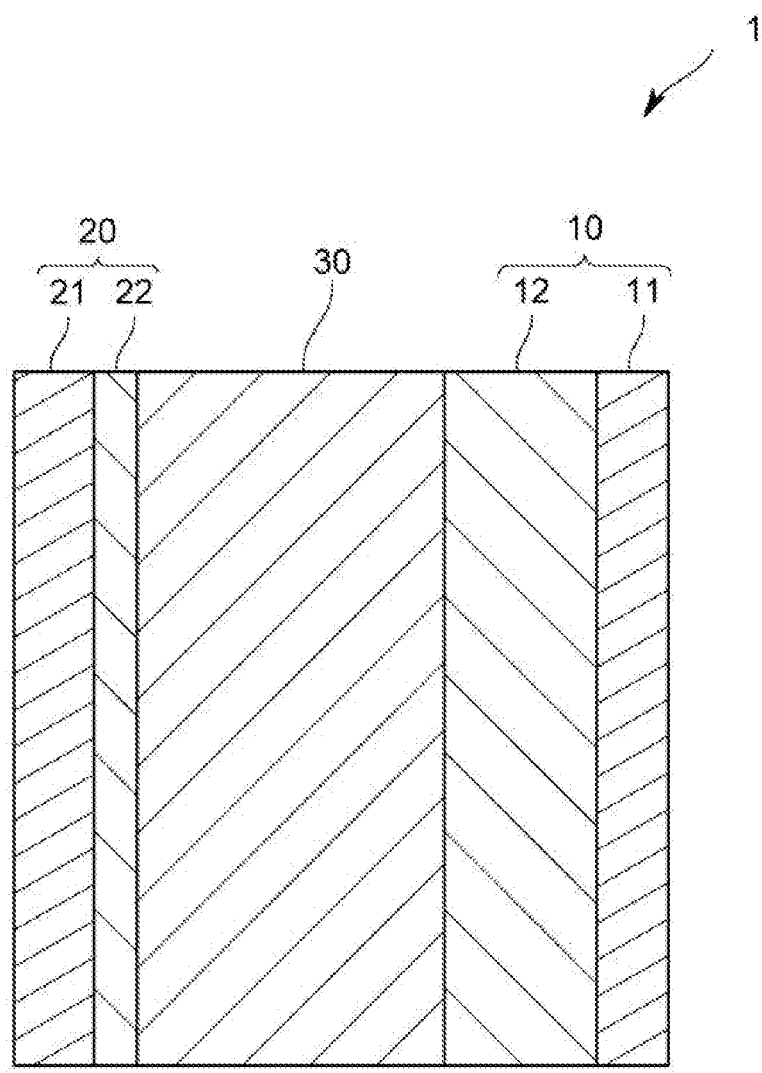
FIG. 1 is a schematic cross-sectional view illustrating a structure of an all-solid secondary battery according to an exemplary embodiment.

The present disclosure will now be described more fully with reference to the accompanying drawings, in which example embodiments are shown. The present disclosure may, however, be embodied in many different forms, should not be construed as being limited to the embodiments set forth herein, and should be construed as including all modifications, equivalents, and alternatives within the scope of the present disclosure; rather, these embodiments are provided so that this disclosure will be thorough and complete, and will fully convey the effects and features of the present disclosure and ways to implement the disclosure to those skilled in the art.

The terminology used herein is for the purpose of describing particular embodiments only and is not intended to be limiting of the present disclosure. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present disclosure is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation. In the following description and drawings, constituent elements having substantially the same functional constitutions are assigned like reference numerals, and overlapping descriptions will be omitted.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, a C rate means a current which will discharge a battery in one hour, e.g., a C rate for a battery having a discharge capacity of 1.6 ampere-hours would be 1.6 amperes.

As used herein, the term "metal" refers to metallic or metalloid elements as defined in the Periodic Table of Elements selected from Groups 1 to 17, including the lanthanide elements and the actinide elements. As used herein, "metalloid" means B, Si, Ge, As, Sb, Te, or a combination thereof.

As used herein, dibutyl phthalate (DBP) oil absorption or oil absorption number (OAN) refers to the number of cubic centimeters of DBP absorbed by 100 grams (g) of amorphous carbon under defined conditions. The DBP oil absorption is proportional to the degree of aggregation of the amorphous carbon structure. The test method for measuring DBP oil absorption may be, for example, ASTM D2414, the content of which is incorporated herein by reference in its entirety.

In an all-solid secondary battery, the use of lithium as an anode active material has been proposed. However, the lithium metal precipitates at the interface between an anode current collector and a solid electrolyte during charge, and the precipitated lithium metal may grow to form a dendrite with repeated cycles of charge and discharge, thereby filling the gaps in the solid electrolyte. The lithium metal which grows into a dendritic form may cause a short circuit and result in a reduction in charge capacity in the secondary battery.

To solve these problems, Japanese Patent Publication No. 2011-086554, the content of which in its entirety is incorporated herein by reference, discloses that a metal layer consisting of lithium or a metal alloyable with lithium is used as an anode active material layer, and an interfacial layer consisting of amorphous carbon is disposed on the anode active material layer. This may allow lithium ions to be dispersed in the interfacial layer, so that the precipitation and growth of lithium metal may be suppressed. However, the all-solid secondary battery disclosed in Japanese Patent Publication No. 2011-086554 is considered insufficient to satisfy recent needs.

It has been advantageously discovered that an all-solid secondary battery having both excellent cycle characteristics and discharge rate characteristics can be obtained by limiting a ratio of the initial charge capacity of the cathode to the initial charge capacity of the anode active material layer to a predetermined range, and using an anode active material layer including an amorphous carbon having a large structure or a large particle diameter, as an anode active material.

It has also been advantageously discovered that by including a certain amount of amorphous carbon in the anode, the number of interfaces between carbon particles or carbon particle aggregates may be reduced, thereby facilitating diffusion of lithium in the anode active material layer, and providing an all-solid secondary battery having both excellent cycle characteristics and excellent discharge rate characteristics.

Hereinafter, an all-solid secondary battery will be described in greater detail. The embodiment presented herein is intended to illustrate an all-solid secondary battery embodying the technical concepts of the present application, however, the present application is not limited to the following embodiments.

1. Structure of all-Solid Secondary Battery

An all-solid secondary battery 1, according to an embodiment, is a lithium secondary battery which is charged and discharged through the migration of lithium ions between a cathode and an anode. In particular, the all-solid secondary battery 1 may include, as illustrated in FIG. 1, a cathode 10, an anode 20, and a solid electrolyte layer 30 interposed between the cathode 10 and the anode 20. The cathode may also be referred to herein as a cathode layer, the anode may also be referred to herein as an anode layer, and the solid electrolyte interposed between the anode and the cathode may also be referred to herein as a solid electrolyte layer.

(1) Cathode

The cathode 10 may include a cathode current collector 11 and a cathode active material layer 12 which are sequentially disposed opposite to the anode 20.

The cathode current collector 11 may have a sheet form or a foil form. The cathode current collector 11 may include a metal such as indium, copper, magnesium, stainless steel, titanium, iron, cobalt, nickel, zinc, aluminum, germanium, lithium, an alloy thereof, or a combination thereof.

The cathode active material layer 12 may reversibly absorb and desorb lithium ions. In particular, the cathode active material layer 12 may include a cathode active material and a solid electrolyte.

For example, the cathode active material may be a lithium salt such as a lithium cobalt oxide (hereinafter, LCO), a lithium nickel oxide, a lithium nickel cobalt oxide, a lithium nickel cobalt aluminum oxide (hereinafter, NCA), a lithium nickel cobalt manganese oxide (hereinafter, NCM), a lithium manganese oxide, a lithium iron phosphate, a lithium phosphate iron oxide, a lithium sulfide, or a combination thereof. In an aspect, the cathode active material layer 12 may include, as the cathode active material, only one of the foregoing, or a combination comprising at least one of the foregoing compounds may be used.

The cathode active material may be, for example, a compound represented by: $Li_aA_{1-b}B'_bD_2$ (wherein $0.90 \leq a \leq 1$, and $0 \leq b \leq 0$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, $0.001 \leq b \leq 0.1$); $Li_aCoG_bO_2$ (wherein $0.90 \leq a \leq 1$, $0.001 \leq b \leq 0.1$); $Li_aMnG_bO_2$ (wherein $0.90 \leq a \leq 1$, $0.001 \leq b \leq 0.1$); $Li_aMn_2GbO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); $LiFePO_4$, or a combination thereof. In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as cathode active materials may have a surface coating layer (hereinafter, also referred to as a "coating layer"). Alternatively, a mixture of a compound without a coating layer and a compound having a coating layer, the compounds being selected from the compounds listed above, may be used. In an embodiment, the coating layer on the surface of such compounds may include a compound of a coating element such as an oxide, a hydroxide, an oxyhydroxide, an oxycarbonate, or a hydroxycarbonate of the coating element. In an embodiment, the compounds for the coating layer may be amorphous or crystalline. In an embodiment, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In an embodiment, the coating layer may be formed on the cathode active material using any suitable method that does not adversely affect the physical properties of the cathode active material. For example, the coating layer may be formed using a spray coating method, a dipping method, or the like. These coating methods are well understood by one of ordinary skill in the art, and thus a detailed description thereof will be omitted.

The cathode active material may include, for example, a lithium transition metal oxide having a layered rocksalt-type structure, and may be selected from among the above-listed lithium transition metal oxides. The term "layered rocksalt-type structure" used herein refers to a structure in which oxygen atomic layers and metal atomic layers are alternately and regularly arranged in the <111> direction, with each atomic layer forming a 2-dimensional (2D) plane. A "cubic rocksalt-type structure" refers to a sodium chloride (NaCl)-type crystal structure, and in particular, a structure in which face-centered cubic (fcc) lattices formed by respective cations and anions are arranged in a way that ridges of the unit lattices are shifted by ½.

A lithium transition metal oxide having such a layered rocksalt-type structure may be, for example, a lithium ternary lithium transition metal oxide such as $LiNi_xCo_yAl_zO_2$ (NCA) (wherein 0<x<1, 0<y<1, 0<z<1, and x+y+z=1), or $LiNi_xCo_yMn_zO_2$ (NCM) (wherein 0<x<1, 0<y<1, 0<z<1, and x+y+z=1). Since the cathode active material layer 12 contains, as the cathode active material, a lithium ternary lithium transition metal oxide having such a layered rocksalt-type structure, the energy density and thermal stability of the all-solid secondary battery 1 may be improved.

The cathode active material may be in the form of particles having, for example, a true-spherical particle shape or an oval-spherical particle shape. The particle diameter of the cathode active material is not particularly limited, and may be in a range suitable for a cathode active material layer of an all-solid secondary battery. The amount of the cathode active material in the cathode active material layer 12 is not particularly limited, and may be in a range suitable for a cathode of an all-solid secondary battery.

The cathode active material may be coated with a coating layer. The coating layer may be any coating layer suitable for a cathode active material of an all-solid secondary battery. A material of the coating layer may be, for example, $Li_2O$—$ZrO_2$.

The solid electrolyte included in the cathode active material layer 12 may be the same as, or different from, a solid electrolyte included in the solid electrolyte layer 30, which is to be described later.

The cathode active material layer 12 may further include, for example, a conducting agent, a binder, a filler, an auxiliary ionic conducting agent, a coating agent, and a dispersing agent which, in addition to the cathode active material and the solid electrolyte. The conducting agent may be, for example, graphite, carbon black, acetylene black, ketjen black, carbon fibers, metal powder, or a combination thereof. The binder may be, for example, a styrene-butadiene rubber (SBR), polytetrafluoroethylene (PTFE), polyvinylidene fluoride (PVDF), polyethylene, or a combination thereof. The coating agent, the dispersing agent, and the auxiliary ionic conducting agent, which may be further added to the cathode active material layer 12, may be any material suitable for use in an electrode of an all-solid secondary battery.

(2) Anode

The anode 20, which is opposite the cathode layer 10, may include an anode current collector 21 and an anode active material layer 22, which are sequentially disposed.

The anode current collector 21 may have a sheet shape or a foil shape. The anode current collector 21 may consist essentially of or consist of a material which does not react with lithium, for example, a material which does not form an alloy or compound with lithium. The material of the anode current collector 21 may be, for example, copper, stainless steel, titanium, iron, cobalt, nickel, or a combination thereof. The anode current collector 21 may include a single metal or may be an alloy or a clad including two or more of these metals.

The anode active material layer 22 may include an anode active material which forms an alloy or a compound with lithium. The anode active material layer may include an amorphous carbon as the anode active material, which forms an alloy or compound with lithium. The amorphous carbon may be a carbon black, such as acetylene black, furnace black, ketjen black, or a combination thereof, or graphene. The anode active material layer 22 may include one or a combination comprising at least one of the foregoing amorphous carbons.

In the all-solid secondary battery 1 according to an embodiment, the anode active material layer 22 may include, as an anode active material, about 33 weight % or greater of an amorphous carbon with respect to the total mass of the anode active material. The amorphous carbon has at least one of the following properties (a) or (b), (a) a nitrogen adsorption specific surface area greater than 0 square meters per gram ($m^2/g$) to about 100 $m^2/g$, and (b) a DBP oil absorption of 150 milliliters mL/100 grams (g) or greater.

By using the amorphous carbon having a nitrogen adsorption specific surface area of about 100 $m^2/g$ or less in the anode active material, the particle diameter of the amorphous carbon may be increased, and thus the number of times lithium is conducted across the grain boundaries of the amorphous carbon particles may be reduced. Therefore, diffusion of lithium within the anode active material layer may be facilitated. As a result, it may be difficult for lithium to be isolated within the anode layer during discharge, and thus the all-solid secondary battery may have improved cycle characteristics and discharge rate characteristics.

The amorphous carbon included as the anode active material may have a nitrogen adsorption specific surface area of, for example, about 1 square meter per gram ($m^2/g$) or greater, about 5 $m^2/g$ or greater, about 10 $m^2/g$ or greater, about 20 $m^2/g$ or greater, about 30 $m^2/g$ or greater, about 40 $m^2/g$ or greater, about 50 $m^2/g$ or greater, or about 60 $m^2/g$ or greater. By having a lower limit of the nitrogen adsorption specific surface area of the amorphous carbon within these ranges, the discharge rate characteristics of the all-solid secondary battery may be further improved. The amorphous carbon included as the anode active material may have a nitrogen adsorption specific surface area of, for example, about 1 $m^2/g$ to about 100 $m^2/g$, about 5 $m^2/g$ to about 100 $m^2/g$, about 10 $m^2/g$ to about 100 $m^2/g$, about 20 $m^2/g$ to about 100 $m^2/g$, about 30 $m^2/g$ to about 100 $m^2/g$, about 40 $m^2/g$ to about 100 $m^2/g$, about 50 $m^2/g$ to about 100 $m^2/g$, or about 60 $m^2/g$ to about 100 $m^2/g$.

As used herein, when the anode active material layer includes a single type of amorphous carbon, the nitrogen adsorption specific surface area of the amorphous carbon included as the anode active material in the anode active material layer refers to the nitrogen adsorption specific surface area of the single type of amorphous carbon. When the anode active material layer includes multiple types of amorphous carbon, the nitrogen adsorption specific surface area refers to the nitrogen adsorption specific surface area of each of the multiple types of amorphous carbon.

The nitrogen adsorption specific surface area of the amorphous carbon included in the anode active material layer 22 may be measured by a nitrogen adsorption method (for example, as described in JIS K6217-2:2001, the content of which is incorporated herein by reference in its entirety). In brief, the amorphous carbon, for example, carbon black, is degassed once at a high temperature of about 300° C., and then cooled down to a liquid nitrogen temperature under a nitrogen atmosphere. Then, once the equilibrium state is reached, a mass increase (nitrogen adsorption amount) of the carbon sample under the nitrogen atmospheric pressure may be measured and applied to the Brunauer-Emmett-Teller (BET) equation, to thereby calculate a value of the nitrogen adsorption specific surface area.

DBP Oil Absorption

Due to the amorphous carbon included as the anode active material, and having a DBP oil absorption of 150 mL/100 g or greater, the size of an aggregate (primary aggregate) of carbon particles may be large, such that diffusion of lithium through the aggregate may be facilitated. As a result, diffusion of lithium within the anode active material layer may be facilitated, and it may be difficult for lithium to be deposited within the anode layer during charge, and thus the all-solid secondary battery may have improved cycle characteristics and discharge rate characteristics.

The amorphous carbon included as the anode active material may have a DBP oil absorption of, for example, about 400 mL/100 g or less, about 350 mL/100 g or less, about 300 mL/100 g or less, about 250 mL/100 g or less, or about 200 mL/100 g or less. By having the upper limit of the DBP oil absorption of the amorphous carbon within these ranges, the discharge rate characteristics may be further improved. The amorphous carbon included as the anode active material may have a DBP oil absorption of, for example, about 150 mL/100 g to about 400 mL/100 g, about 150 mL/100 g to about 350 mL/100 g, about 150 mL/100 g to about 300 mL/100 g, about 150 mL/100 g to about 250 mL/100 g, or about 150 mL/100 g to about 200 mL/100 g.

As used herein, when the anode active material layer includes one type of amorphous carbon as the anode active material in the anode active material layer, the "DBP oil absorption" may correspond to the DBP oil absorption of the one type of amorphous carbon. When the anode active material layer includes multiple types of amorphous carbon as the anode active material in the anode active material layer, the "DBP oil absorption" may correspond to the DBP oil absorption of each of the multiple types of amorphous carbon.

The DBP oil absorption of the amorphous carbon included in the anode active material layer may be determined by a DBP oil absorption measurement method, such as that defined in JIS K6217-4:2008, the content of which is incorporated herein by reference in its entirety. Specifically, a sample being stirred with a rotor, may be titrated with dibutyl phthalate (DBP) at a constant rate from a burette. As the DBP is added, the mixture may be change from a freely flowing powder into a slightly viscous mass. The end point of the measurement is reached when the torque generated by the change in viscosity reaches a set value or reaches a certain proportion of the maximum torque obtained from the torque curve. The volume (mL) of DBP at the end point may be divided by the mass (g) of the sample, and then multiplied by 100, to thereby calculate a DBP oil absorption (mL/100 g).

The anode active material layer may include, amorphous carbon as the only anode active material able to form an alloy or compound with lithium, or may further include a metal or metalloid in addition to the amorphous carbon. For example, the metal or metalloid may be gold, platinum, palladium, silicon, silver, aluminum, bismuth, tin, indium, zinc, or a combination thereof.

When the metal or metalloid is further included as an anode active material, the metal or metalloid anode active material may have a particle diameter of, for example, about 4 micrometers (μm) or less, or about 100 nanometers (nm) or less. For example, the particle diameter of the metal or metalloid anode active material refers to the median diameter (D50) measured using a laser particle distribution analyzer. The lower limit of the particle diameter is not specifically limited, but may be, for example, about 10 nm. The anode active material may have a particle diameter of, for example, about 4 μm or less, about 3 μm or less, about 2 μm or less, about 1 μm or less, or about 900 nm or less. For example, the anode active material may have a particle diameter of about 10 nm to about 4 μm, about 10 nm to about 3 μm, about 10 nm to about 2 μm, about 10 nm to about 1 μm, or about 10 nm to about 900 nm. An all-solid secondary battery including a metal or metalloid anode active material having a particle diameter within these ranges, may have further improved output characteristics and cycle characteristics. This effect may be achieved when the anode active material layer includes a metal or metalloid capable of forming a compound or an alloy with lithium, such as gold, platinum, palladium, silicon, silver, aluminum, bismuth, tin, indium, zinc, or a combination thereof, in an amount of about 5 weight % or greater with respect to the total mass of the anode active material. For example, nickel (Ni), which does not form an alloy with lithium, is not the anode active material.

Total Amount of Amorphous Carbon

When the anode active material layer includes less than 33 weight % of an amorphous carbon having (a) a nitrogen adsorption specific surface area greater than 0 $m^2$/g to 100 $m^2$/g, (b) a DBP oil absorption of 150 mL/100 g or greater, or a combination of (a) and (b), the cycle characteristics and discharge rate characteristics of the all-solid secondary battery may not be sufficiently improved. Accordingly, the amount of the amorphous carbon having the properties of (e.g., satisfying the conditions of) (a) and/or (b) in the anode active material layer is 33 weight % or greater, based on a total weight of the anode active material.

The upper limit of the amount of the amorphous carbon satisfying the condition of (a) and/or (b) is not specifically limited, but may be, for example, 95 weight % or less.

As used herein, the amount of the amorphous carbon in the anode active material layer refers to a total weight of one type or multiple types of the amorphous carbon satisfying the condition of (a) and/or (b), with respect to (i.e., relative to) the total weight of the anode active material included in the anode active material layer, which is regarded as 100 weight %. For example, the anode active material layer may include a mixture of the amorphous carbon and a metal or metalloid such as gold (Au), platinum (Pt), palladium (Pd), silicon (Si), silver (Ag), aluminum (Al), bismuth (Bi), tin (Sn), zinc (Zn), or a combination thereof. The amount of the amorphous carbon may be, for example, about 33 weight % to 95 weight %, about 40 weight % to 95 weight %, about 45 weight % to 95 weight %, about 50 weight % to 95 weight %, about 55 weight % to 95 weight %, about 60 weight % to 95 weight %, about 65 weight % to 95 weight %, or about 70 weight % to 95 weight %, with respect to the total weight of the mixture. The amount of the amorphous carbon may be, for example, about 33 weight % to 92.5 weight %, about 33 weight % to 90 weight %, or about 33 weight % to 87.5 weight %, with respect to the total weight of the mixture. The amount and/or type of the amorphous carbon satisfying the condition of (a) and/or (b) in the anode active material layer may be measured using, for example, the following methods. First, the amount of carbon in the anode active material layer may be measured using a combustion method. In particular, the amount of carbon in the anode active material layer may be measured by heating a sample of the anode active material layer at a high temperature under an atmosphere of helium mixed with oxygen to quantify amount of carbon dioxide generated therefrom. Second, the number of different types of the amorphous carbon included in the anode active material layer may be identified by particle size distribution evaluation using a laser scattering method. The particle diameter and structure of the amorphous carbon may be observed using transmission electron microscopy (TEM). By combining the results of the combustion method and particle size observation, information about the types of amorphous carbon included in the anode active material layer, the amounts of the various types of amorphous carbon, and the particle diameter and structure of the various types of amorphous carbon may be obtained, so that the amount of the amorphous carbon satisfying the condition of (a) and/or (b) in the anode active material layer may be measured. It may also be possible to evaluate, from the preparation conditions of the anode active material layer (such as the nitrogen adsorption specific surface area, DBP oil absorption, amounts of the various types of amorphous carbon, and an amount of the other anode active material), the amount of the amorphous carbon satisfying the condition of (a) and/or (b) in the anode active material layer of the all-solid secondary battery 1, which is a final product.

The anode active material layer may further include a binder. By the inclusion of the binder, the anode active material layer may be stabilized on the anode current corrector. A material of the binder may be, for example, a resin material such as styrene butadiene rubber (SBR), polytetrafluoroethylene (PTFE), polyvinylidene fluoride (PVDF), polyethylene (PE), or a combination thereof.

As the anode active material layer includes such a binder, the anode active material layer may be stabilized on the anode current collector. In addition, cracking of the anode active material layer may be suppressed despite a volume change and/or a relative positional change of the anode active material layer during charging and discharging processes. For example, when the anode active material layer does not include a binder, the anode active material layer may be easily separated from the anode current collector. A region of the anode current collector from which the anode active material layer is separated may be exposed and thus may contact the solid electrolyte layer, such that a short circuit is more likely to occur. The anode active material layer may be formed, for example, by applying onto the anode current collector, a slurry in which a material for forming the anode active material layer is dispersed, and then drying the applied slurry. By the inclusion of the binder in the anode active material layer, the anode active material may be stably dispersed in the slurry. For example, when the slurry is applied onto the anode current collector by using a screen printing method, clogging of the screen (for example, clogging by an aggregate of the anode active material) may be suppressed.

The anode active material layer may have a thickness of, for example, 50% or less, about 40% or less, about 30% or less, about 20% or less, about 10% or less, or about 5% or less of the thickness of the cathode active material layer. For example, the anode active material layer may have a thickness of about 0.1 μm to about 20 μm, about 0.5 μm to about 20 μm, about 0.5 μm to about 15 μm, about 0.5 μm to about 10 μm, about 1 μm to about 10 μm, or about 1 μm to about 7 μm. When the thickness of the anode active material layer is too small, the anode active material layer may be collapsed by lithium dendrites formed between the anode active material layer and the anode current collector, so that the cycle characteristics of the all-solid lithium secondary battery may not be improved. When the thickness of the anode active material layer is too large, the all-solid lithium secondary battery may have reduced energy density, and may have increased internal resistance due to the anode active material layer, and thus may not have improved cycle characteristics.

The anode active material layer may further include an additive(s) which is suitable for use in an all-solid secondary battery, for example, a filler, a dispersing agent, an ionic conductor, or a combination thereof, amounts of each of which may be determined by the person of skill in the art without undue experimentation.

The all-solid lithium secondary battery 1 may further include a thin film (not shown) on the anode current collector 21, the thin film including an element which is alloyable with lithium. The thin film may be disposed, for example, between the anode current collector 21 and the anode active material layer 22. For example, the thin film may include an element alloyable with lithium. The element alloyable with lithium may be, for example, gold, silver, zinc, tin, indium, silicon, aluminum, bismuth, or a combination thereof, but is not limited thereto. Any element alloyable with lithium may be used. The thin film may consist of one of these metals or an alloy of these metals. Due to the disposition of the thin film on the anode current collector 21, for example, a layer of metal deposited between the thin film and the anode active material layer 22 may be planarized, further improving cycle characteristics of the all-solid lithium secondary battery 1.

For example, the thin film may have a thickness of about 1 nm to about 800 nm, about 10 nm to about 700 nm, about 50 nm to about 600 nm, or about 100 nm to about 500 nm. When the thickness of the thin film is less than 1 nm, the thin film may not properly function. When the thickness of the thin film is too thick, the thin film may absorb lithium, so that the amount of lithium deposition on the anode may be reduced, leading to degradation in energy density and cycle characteristics of the all-solid lithium secondary battery. The thin film may be disposed on the anode current collector, for example, using lithium deposition, sputtering, or plating. However, embodiments are not limited to these methods, and any suitable method of thin film formation may be used.

Figure 2:
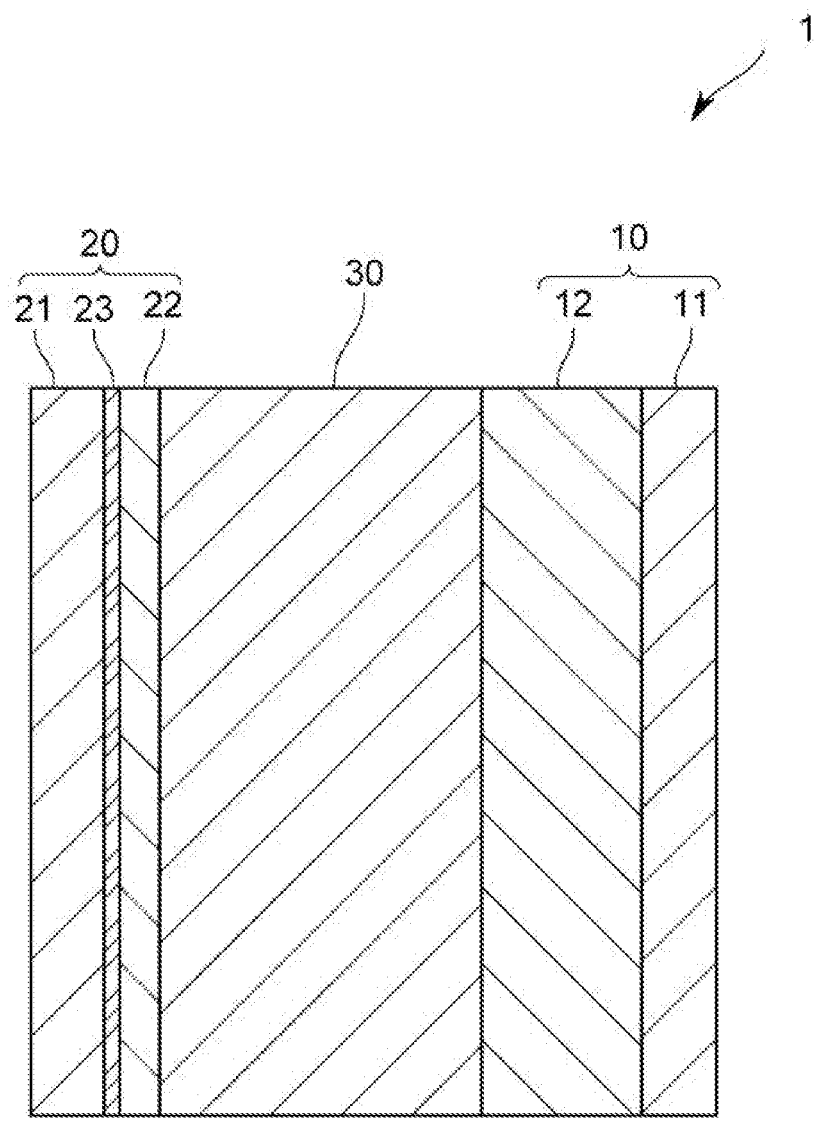
FIG. 2 is a schematic cross-sectional view illustrating a structure of the all-solid secondary battery after overcharging of the anode.
Figure 3:
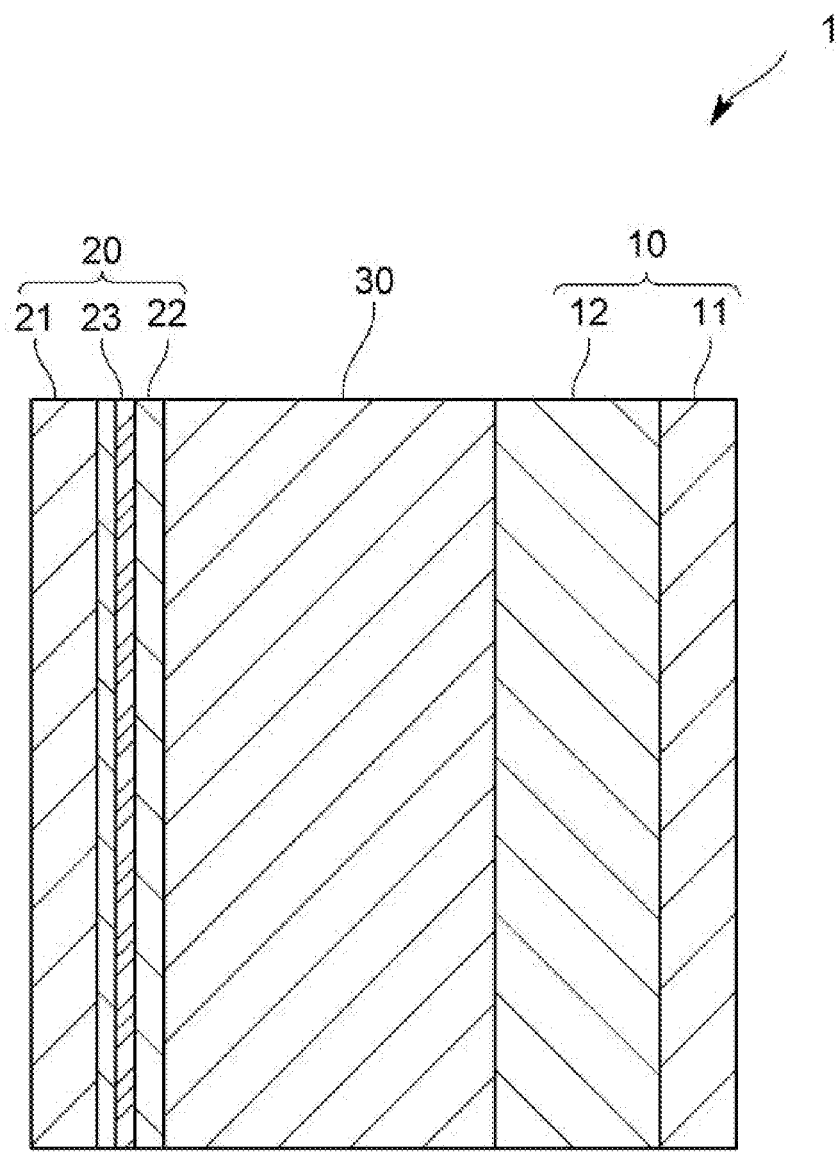
FIG. 3 is a cross-sectional view of an all-solid secondary battery according to another exemplary embodiment.
Figure 4:
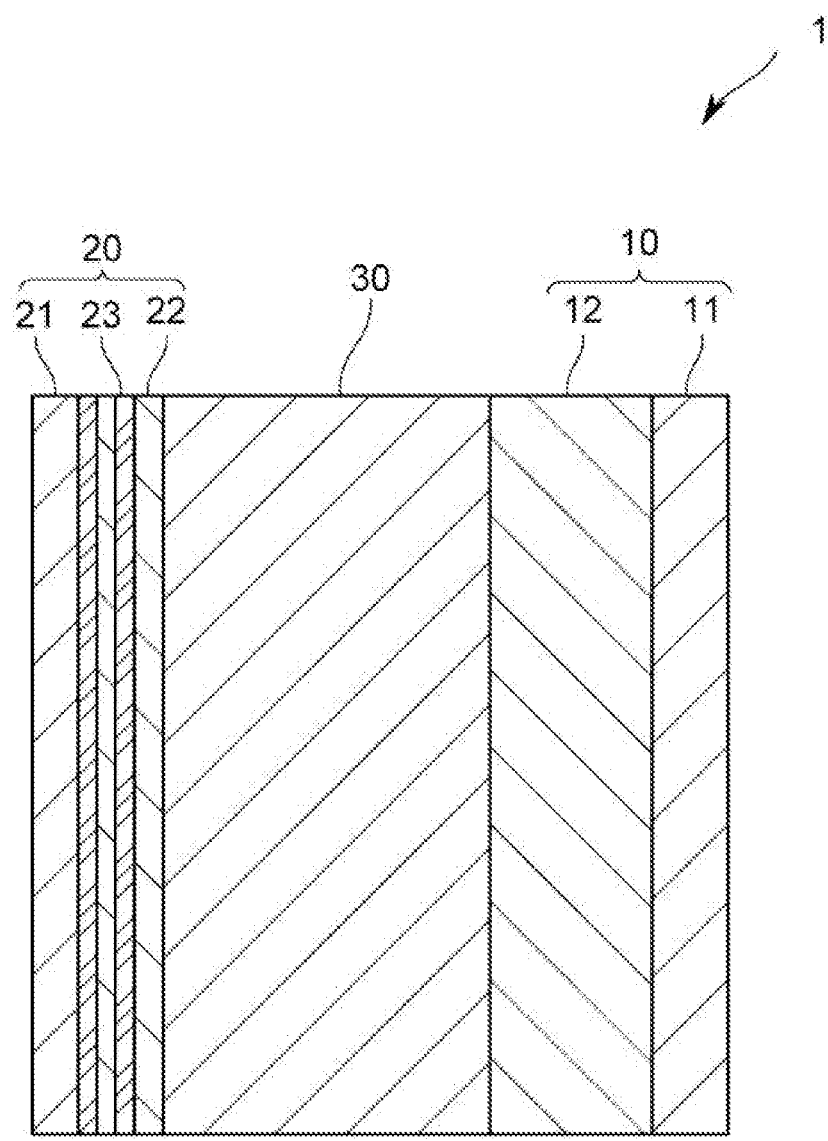
FIG. 4 is a cross-sectional view of an all-solid secondary battery according to another exemplary embodiment.

Referring to FIGS. 2 to 4, the all-solid lithium secondary battery 1 may further include a metal layer 23 disposed, for example, between the anode current collector 21 and the solid electrolyte layer 30, through charging. Referring to FIGS. 2 to 4, the all-solid lithium secondary battery may further include the metal layer 23 disposed, for example, between the anode current collector 21 and the anode active material layer 22, through charging. Referring to FIGS. 3 and 4, the all-solid lithium secondary battery 1 may further include the metal layer 23 disposed, for example, within the anode active material layer 22, through charging. The metal layer 23 may consist of, or consist essentially of, a lithium metal or a lithium alloy. Accordingly, the metal layer 23 may function as, for example, a lithium reservoir. The lithium alloy may be, for example, a Li—Al alloy, a Li—Sn alloy, a Li—In alloy, a Li—Ag alloy, a Li—Au alloy, a Li—Zn alloy, a Li—Ge alloy, a Li—Si alloy, or a combination thereof. However, embodiments are not limited thereto. Any lithium alloy may be used. The thickness of the metal layer 23 is not specifically limited. For example, the metal layer may have a thickness of about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness of the metal layer is too small, the metal layer may not properly serve as a lithium reservoir. When the thickness of the metal layer is too large, the mass and volume of the all-solid lithium secondary battery may be disadvantageously increased, and it is likely that the cycle characteristics thereof may be degraded.

In other embodiments, the metal layer may be, for example, a metal foil having a thickness within the above-described ranges. In the all-solid lithium secondary battery 1, for example, before assembling of the all-solid lithium secondary battery 1, the metal layer 23 may be disposed between the anode current collector 21 and the anode active material layer 22. When a lithium metal foil as the metal layer 23 is disposed between the anode current collector 21 and the anode active material layer 22 prior to the assembly of the all-solid lithium secondary battery 1, the lithium metal foil may serve as a lithium reservoir.

(3) Solid Electrolyte Layer

The solid electrolyte layer 30 may be disposed between the cathode 10 and the anode 20, and in particular, between the cathode active material layer 12 and the anode active material layer 22. The solid electrolyte layer may include a solid electrolyte which is capable of transferring ions.

The solid electrolyte may consist of, or consist essentially of, for example, a solid electrolyte material including a sulfide (hereinafter, referred to as a sulfide-based solid electrolyte material). The sulfide-based solid electrolyte material may be, for example, $Li_2S$—$P_2S_5$, $Li_2S$—$P_2S_5$—LiX (wherein X is a halogen, for example, I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S$—LiI, $Li_2S$—$B_2S_3$, $Li_2S$—$P_2S_5$—$Z_mS_n$ (wherein m and n are each independently a positive number, and Z is Ge, Zn or Ga), $Li_2S$—$GeS_2$, $Li_2S$ $Li_3PO_4$, $Li_2S$—$SiS_2$-$Li_pMO_q$ (wherein p and q are each independently a positive number, and M is P, Si, Ge, B, Al, Ga, or In). A combination comprising at least one of the foregoing sulfide-based solid electrolyte material may also be used.

Of the above-described sulfide-based solid electrolyte materials, a material consisting of sulfur (S), phosphorous (P), and lithium (Li) may be used as the solid electrolyte. For example, a sulfide-based solid electrolyte material including $Li_2S$—$P_2S_5$ may be used. When a material including $Li_2S$—$P_2S_5$ is used as the sulfide-based solid electrolyte material, a mixed molar ratio of $Li_2S$ to $P_2S_5$($Li_2S$:$P_2S_5$) may be, for example, within the range of about 50:50 to about 90:10.

The solid electrolyte may be in an amorphous state or may be in a crystalline state. The solid electrolyte may be in a mixed state of amorphous and crystalline forms.

The sulfide-based solid electrolyte material may include, for example, $Li_7P_3S_{11}$, $Li_7PS_6$, $Li_4P_2S_6$, $Li_3PS_6$, $Li_3PS_4$, $Li_2P_2S_6$, or a combination thereof.

The sulfide-based solid electrolyte material may include, for example, an argyrodite-type solid electrolyte represented by Formula 1.

$$Li^+{}_{12-n-x}A^{n+}X^{2-}{}_{6-x}Y^{1-}{}_x \quad \text{Formula 1}$$

In Formula 1, A may be P, As, Ge, Ga, Sb, Si, Sn, Al, In, Ti, V, Nb, or Ta; X may be S, Se, or Te; Y may be Cl, Br, I, F, CN, OCN, SCN, or $N_3$, 0≤x≤2, and n is a valence of A. In an embodiment, n may be 3, 4, or 5.

The argyrodite-type solid electrolyte may include, for example, $Li_{7-x}PS_{6-x}Cl_x$ (wherein 0≤x≤2), $Li_{7-x}PS_{6-x}Br_x$ (wherein 0≤x≤2), $Li_{7-x}PS_{6-x}I_x$ (wherein 0≤x≤2), or a combination thereof. For example, the argyrodite-type solid electrolyte may include $Li_6PS_5Cl$, $Li_6PS_5Br$, $Li_6PS_5I$, or a combination thereof.

The solid electrolyte may have an elastic modulus, that is, a Young's modulus of, for example, about 35 gigapascals (GPa) or less, about 30 GPa or less, about 27 GPa or less, about 25 GPa or less, or about 23 GPa or less. For example, the solid electrolyte may have an elastic modulus, that is, a Young's modulus of, for example, about 10 to about 35 GPa, about 15 to about 35 GPa, about 15 to about 30 GPa, or about 15 to about 25 GPa. As the solid electrolyte has an elastic modulus within these ranges, pressing and/or sintering of the solid electrolyte may be performed more easily.

The solid electrolyte layer may further include a binder. A material of the binder may be, for example, a resin such as styrene butadiene rubber (SBR), polytetrafluoroethylene (PTFE), polyvinylidene fluoride (PVDF), polyethylene (PE), polyacrylic acid (PAA), or a combination thereof. The material of the binder may be the same as or different from the material of the binder in the cathode active material layer 12 and the anode active material layer 22.

(4) Initial Charge Capacity Ratio

According to one or more embodiments, the all-solid secondary battery 1 according to an embodiment may be configured such that the initial charge capacity of the cathode active material layer 12 is greater than the initial charge capacity of the anode active material layer 22. The all-solid secondary battery 1 according to an embodiment is charged (i.e., overcharged) until the initial charge capacity of the anode active material layer 22 is exceeded, as described later. At an initial charging stage, lithium is absorbed into the anode active material layer 22. That is, the anode active material may form an alloy or a compound with lithium ions that have migrated from the cathode layer 10. When the all-solid secondary battery 1 is charged (i.e., overcharged) beyond the initial charge capacity of the anode active material layer 22, lithium may be deposited on a rear surface of the anode active material layer 22, i.e., between the anode current layer 21 and the anode active material layer 22, thus forming the metal layer 23, as shown in FIG. 2. The metal layer 23 may consist of lithium (i.e., metal lithium). Without being limited by theory, it is understood that the formation of the lithium metal layer is attributed to the anode active material which consists of a certain material, i.e., a material able to form an alloy or a compound with lithium. During discharge, the lithium in the anode active material layer 22 and the metal layer 23 may be ionized and move toward the cathode layer 10. Accordingly, in the all-solid secondary battery 1, lithium may be used as an anode active material. Since the anode active material layer 22 is disposed on (e.g., coats) the metal layer 23, the anode active material layer 22 may function as a protective layer for the metal layer 23, and at the same time suppress deposition and growth of dendritic metal lithium. This may suppress a short circuit and capacity reduction in the all-solid secondary battery 1, and thus further improve the characteristics of the all-solid secondary battery. In the case where the metal layer 23 is disposed by charging of the all-solid lithium secondary battery after assembly, for example, in the initial state or fully discharged state of the all-solid secondary battery, the anode current collector 21, the anode active material layer 22, and a region therebetween may be a Li-free region, e.g., a region not including a Li metal or Li alloy.

In particular, in the all-solid secondary battery 1 according to an embodiment, a ratio of the initial charge capacity of the cathode active material layer to the initial charge capacity of the anode active material layer, i.e., the initial charge capacity ratio, may satisfy Inequality 1.

$$0.01 < b/a < 0.5 \quad \text{Inequality 1}$$

In Inequality 1, a is the initial charge capacity (milliampere hours, mAh) of the cathode active material layer 12, and b is the initial charge capacity (mAh) of the anode active material layer 22.

The initial charge capacity ratio may be, for example, $0.01 < b/a \le 0.45$, $0.01 < b/a \le 0.4$, $0.02 \le b/a \le 0.3$, $0.03 \le b/a \le 0.2$, or $0.05 \le b/a \le 0.1$.

When the initial charge capacity ratio is 0.01 or less, the characteristics of the all-solid secondary battery may be deteriorated. Without being limited by theory, it is believed that the deterioration in battery properties may result because the anode active material layer does not sufficiently function as a protective layer. For example, when the thickness of the anode active material layer is too small, the initial charge capacity ratio may be 0.01 or less. In this case, the anode active material layer may be collapsed through repeated charging and discharging, so that deposition and growth of dendritic metal lithium may likely occur. Accordingly, the characteristics of the all-solid secondary battery may be deteriorated. For this reason, the initial charge capacity ratio is limited to be greater than 0.01.

When the initial charge capacity ratio is 0.5 or greater, the deposition amount of lithium on the anode may be reduced, so that the battery capacity may be reduced. For this reason, the initial charge capacity ratio is limited to be smaller than 0.5.

Measurement of Initial Charge Capacity

The initial charge capacity of each of the cathode active material layer 12 and the anode active material layer 22 may be calculated using the following method.

The initial charge capacity of the cathode active material layer may be obtained, for example, by multiplying a charge capacity density (mAh/g) of the cathode active material by the mass of the cathode active material in the cathode active material layer. When multiple types of cathode active materials are used, the initial charge capacity of the cathode active material layer may be determined by multiplying the charge capacity density of each cathode active material by the mass thereof and calculating a total sum of the multiplication values of the cathode active materials as the initial charge capacity of the cathode active material layer.

The initial charge capacity of the anode active material layer may be calculated using the same method. That is, the initial charge capacity of the anode active material layer may be obtained, for example, by multiplying a charge capacity density (mAh/g) of the anode active material by the mass of the anode active material in the anode active material layer. When multiple types of anode active materials are used, the initial charge capacity of the anode active material layer may be determined by multiplying the charge capacity density of each anode active material by the mass thereof and calculating a total sum of the multiplication values of the anode active materials as the initial charge capacity of the anode active material layer.

The charge capacity densities of the cathode active material and the anode active material are capacities evaluated by using an all-solid half cell using lithium metal as a counter electrode.

The initial charge capacities of the cathode active material layer and the anode active material layer may be directly measured using an all-solid half cell. As a specific method of directly measuring an initial charge capacity, the following method may be used.

First, after manufacturing an all-solid half cell using the cathode active material layer as a working electrode and Li as a counter electrode, constant current-constant voltage (CC-CV) charging is performed thereon from an open-circuit voltage (OCV) to the upper limit charging voltage to thereby measure the initial charge capacity of the cathode active material layer. The upper limit charging voltage, which is defined in the standard of JIS C 8712:2015, is 4.25 V for lithium cobalt oxide-based cathodes, and may refer to, for other cathodes, a voltage which can be obtained by applying the safety requirements (for applying other upper limit charging voltages) prescribed in A. 3.2.3 of JIS C 8712:2015. The initial charge capacity of the anode active material layer may be measured by performing constant current-constant voltage (CC-CV) charging from an open-circuit voltage (OCV) to 0.01 V with an all-solid half cell manufactured using the anode active material layer as a working electrode, and Li as a counter electrode.

The above-described all-solid half cell may be manufactured, for example, using the following method. The cathode active material layer or the anode active material layer of which initial charge capacity is to be measured may be punched into a disc form having a diameter of about 13 millimeters (mm). 200 milligrams (mg) of the solid electrolyte powder used in the all-solid secondary battery may be hardened under a pressure of about 40 megapascals (MPa) to form a pellet having a diameter of about 13 mm and a thickness of about 1.5 mm. After this pellet is put into a tube having an inner diameter of about 13 mm, the cathode active material layer or the anode active material layer punched in a disc form may be put into the tube from one side thereof, and a lithium foil having a diameter of about 13 mm and a thickness of 0.03 mm may then be put into the tube from the opposite side thereof. Furthermore, a stainless steel disc may be put into the tube on each of the sides, and then the tube may be pressed in the axial direction of the tube with a pressure of about 300 Mpa or greater to 1000 MPa or less, for about 1 minute, to integrate the components in the tube. When integrating the components, a pressure of about 300 MPa or greater may be applied to easily put the components in dose contact. When the applied pressure is 1000 MPa or greater, the effect thus achieved is stagnant. Accordingly, the pressure may be about 1000 MPa or less. The resulting structure may then be sealed in a case in which a pressure of 22 MPa is constantly applied, thereby manufacturing an all-solid half cell.

(5) Structure of all-Solid Secondary Battery

According to one or more embodiments, the all-solid secondary battery 1 may include, as shown in FIGS. 1 to 4, the cathode 10, the anode 20, and the solid electrolyte layer 30 placed between the cathode 10 and the anode 20. The cathode 10 may include the cathode active material layer 12 and the cathode current collector 11, and the anode 20 may include the anode active material layer 22 and the anode current collector 21.

Referring to FIG. 1, the all-solid secondary battery 1 may include, for example, the cathode current collector 11, the cathode active material layer 12, the solid electrolyte layer 30, the anode active material layer 22 which forms an alloy or a compound with lithium, and the anode current collector 21 in this stated order. The anode active material layer 22 may include amorphous carbon, and metal or metalloid anode active material particles. The anode current collector 21 may include, for example, nickel, stainless steel, titanium, iron, cobalt, copper, or a combination thereof.

Referring to FIG. 2, the all-solid secondary battery 1 may include, for example, the cathode current collector 11, the cathode active material layer 12, the solid electrolyte layer 30, the anode active material layer 22 which forms an alloy or a compound with lithium, the metal layer 23, and the anode current collector 21 in this stated order. The anode active material layer 22 may include amorphous carbon, and metal or metalloid anode active material particles. The anode current collector 21 may include, for example, at nickel, stainless steel, titanium, iron, cobalt, copper, or a combination thereof.

Referring to FIGS. 1-2, the all-solid secondary battery 1 may further include the anode current collector 21 stacked on a side of the anode active material layer 22 opposite to the solid electrolyte layer 30, and the anode current collector 21 may be a thin film formed of stainless steel.

Referring to FIGS. 1-2, in the all-solid secondary battery 1, the cathode active material layer 12, the solid electrolyte layer 30, and the anode active material layer 22 may be sealed with a laminate film (not shown).

2. Method of Manufacturing all-Solid Secondary Battery

Next, a method of manufacturing the all-solid secondary battery 1 according to the above-described embodiments will be described. The all-solid secondary battery 1 according to the one or more embodiments may be obtained by separately forming the cathode 10, the anode 20, and the solid electrolyte layer 30, and then laminating them.

(1) Formation of Cathode Layer

First, starting materials, such as a cathode active material and a binder of the cathode active material layer, may be added to a non-polar solvent to prepare a slurry (for example, a paste). Next, the prepared slurry may be coated on the cathode current collector, which is previously prepared, and then dried to obtain a laminate. Subsequently, the obtained laminate may be pressed using, for example, isotactic pressing, to thereby obtain the cathode. The pressing may be omitted.

(2) Formation of Anode Layer

First, starting materials, such as an anode active material and a binder, of the anode active material layer may be added to a polar solvent or a non-polar solvent to prepare a slurry (for example, a paste). Next, the prepared slurry may be coated on the anode current collector, and then dried to obtain a laminate. Subsequently, the obtained laminate may be pressed using, for example, isotactic pressing to thereby form the anode. The pressing may be omitted.

(3) Formation of Solid Electrolyte Layer

The solid electrolyte layer 30 may be formed of a solid electrolyte material prepared from a sulfide-based solid electrolyte material.

First, a starting source material (for example, $Li_2S$ or $P_2S_5$) may be treated by melt quenching or mechanical milling to thereby obtain the sulfide-based solid electrolyte material.

For example, in the case of melt quenching, after predetermined amounts of the starting source materials are mixed together and then made into pellets, the pellets may be subjected to reaction under vacuum at a predetermined reaction temperature, and then quenched to prepare a sulfide-based solid electrolyte material. In addition, the reaction temperature of the mixture of $Li_2S$ and $P_2S_5$ may be, for example, about 400° C. to about 1000° C., or about 800° C. to about 900° C. The reaction time may be, for example, about 0.1 to 12 hours, or about 1 to 12 hours. In addition, the quenching temperature of the reaction product may be normally, for example, about 10° C. or lower, or about 0° C. or lower, and the quenching rate may be normally, for example, about 1 degree Celsius per second (° C./sec) to about 10,000° C./sec, or about 1° C./sec to about 1000° C./sec.

In the case of using mechanical milling, the starting source materials may be reacted while stirring using, for example, a ball mill, to thereby prepare a sulfide-based solid electrolyte material. The stirring rate and stirring time in the mechanical milling are not specifically limited. However, the higher the stirring rate, the faster the production rate of the sulfide-based solid electrolyte material may become. The longer the stirring time, the greater the rate of conversion of the source materials into the sulfide-based solid electrolyte material.

Then, the obtained mixed source material (sulfide-based solid electrolyte material) may be thermally treated at a predetermined temperature and then subjected to grinding to thereby prepare a solid electrolyte in the form of particles. When the solid electrolyte has a glass transition temperature, the solid electrolyte may be converted from an amorphous phase to a crystalline phase through thermal treatment.

Subsequently, the solid electrolyte material obtained through the above-described method may be subjected to film formation using an existing film formation method, for example, aerosol deposition, cold spraying, or sputtering, to thereby form a solid electrolyte layer 30. The solid electrolyte layer 30 may be formed by pressing only solid electrolyte material particles. The solid electrolyte layer 30 may be formed by mixing a solid electrolyte material, a solvent, and a binder together to obtain a mixture, coating the mixture, and drying and pressing the resulting product.

(4) Lamination

The solid electrolyte layer 30 may be disposed between the cathode 10 and the anode 20, and then pressed using, for example, isotactic pressing, to thereby obtain the all-solid secondary battery 1 according to an embodiment.

For example, the method of manufacturing the all-solid secondary battery may further include pressing, by isotactic pressing, the cathode active material layer, the solid electrolyte layer, and the anode active material layer, which are stacked in the stated order.

The pressing may be performed, for example, at a temperature from room temperature (about 20-22° C.) to 90° C. or less, or a temperature from about 20° C. to about 90° C. In other embodiments, the pressing may be performed at a high temperature of 100° C. or greater. The pressing time may be, for example, about 30 minutes or shorter, about 20 minutes or shorter, about 15 minutes or shorter, or about 10 minutes or shorter. The pressing time may be, for example, about 1 millisecond (ms) to about 30 minutes, about 1 ms to about 20 minutes, about 1 ms to about 15 minutes, or about 1 ms to about 10 minutes. The pressing may be performed using, for example, isotactic pressing, roll pressing, or flat pressing. However, embodiments are not limited thereto. Any suitable pressing method may be used. A pressure applied in the pressing may be, for example, about 300 MPa or greater, about 350 MPa or greater, about 400 MPa or greater, about 450 MPa or greater, about 500 MPa or greater, or about 550 MPa or greater. For example, the pressure applied in the pressing may be about 300 MPa to about 1000 MPa, about 350 MPa to about 950 MPa, about 400 MPa to about 900 MPa, about 450 MPa to about 850 MPa, about 500 MPa to about 800 MPa, or about 550 MPa to about 750 MPa. Through the pressing under such conditions, for example, the solid electrolyte particles may be sintered to thereby form the solid electrolyte layer.

When the all-solid secondary battery manufactured using the above-described method is charged and/or discharged, the all-solid secondary battery may be operated under pressure. The pressure may be about 0.5 MPa or greater, about 5 MPa or greater, or about 10 MPa or greater. The pressure may be applied by, for example, a method involving placing the all-solid lithium secondary battery between two rigid plates and then securing the all-solid lithium secondary battery between the two plates with screws.

The two plates may be a high-hardness plate having, for example, a Mohs hardness scale of 1.5 or greater, 2.0 or greater, 2.5 or greater, 3.0 or greater, 3.5 or greater, 4.0 or greater, 4.5 or greater, or 5.0 or greater. For example, the Mohs hardness scale of stainless steel is 5.5 to 6.3, the Mohs hardness scale of aluminum is 2 to 2.4, the Mohs hardness scale of brass is 3.0, and the Mohs hardness scale of glass is 5.5. For example, the plates may have a Moh's hardness of about 1.5 to about 6.3. For example, the rigid plates may be formed of a material such as stainless steel, brass, aluminum glass, or a combination thereof.

In the all-solid lithium secondary battery according to one or more embodiments, as charging and discharging of the all-solid lithium secondary battery are repeated, for example, pores may be formed at the interface between the metal layer and the anode active material layer, due to dissolution via an ionization of the precipitated metal lithium. To inhibit the formation of the pores and corresponding reduction in battery output, the pressure may be maintained to be, for example about 0.5 MPa or greater. When the pressure is too high, a short circuit of the battery may occur. Accordingly, the pressure may be, for example, 10 MPa or less.

3. Method of Charging all-Solid Secondary Battery

A method of charging the all-solid secondary battery 1 will now be described.

In one or more embodiments, the method of charging the all-solid secondary battery 1 is characterized in that the all-solid secondary battery 11 may be charged (i.e., overcharged) until the charge capacity of the anode active material layer 22 is exceeded.

At an initial charging stage, lithium may be absorbed into the anode active material layer 22. When the all-solid secondary battery 1 is charged beyond the initial charge capacity of the anode active material layer 22, lithium may be deposited, as shown in FIG. 2, on a rear surface of the anode active material layer 22, i.e., between the anode current collector 21 and the anode active material layer 22, thus forming the lithium metal layer 23, which was not present during assembling the all-solid lithium secondary battery 1. During discharging, the lithium in the anode active material layer 22 and the metal layer 23 may be ionized and move toward the cathode layer 10. Accordingly, in the all-solid secondary battery 1, lithium may be used as an anode active material. Furthermore, since the anode active material layer 22 coats the metal layer 23, the anode active material layer 22 may function as a protective layer of the metal layer 23, and at the same time suppress deposition and growth of lithium metal dendrites. Accordingly, a short-circuit and reduction in capacity of the all-solid secondary battery may be suppressed, and furthermore, characteristics of the all-solid secondary battery may be improved. In addition, according to such embodiments, since the metal layer is not previously formed prior to the initial charge, manufacturing costs of the all-solid secondary battery may be reduced.

When the amount of charge of the all-solid secondary battery is less than two times the initial charge capacity of the anode active material layer, the amount of lithium deposited on the anode layer may be reduced, and the battery capacity may be reduced. For this reason, the amount of charge of the all-solid secondary battery may be at least two times the initial charge capacity of the anode active material layer.

When the charge amount of the all-solid secondary battery exceeds 100 times the initial charge capacity of the anode active material layer 22, the thickness of the anode layer 20 may become insufficient, and the anode layer 20 may collapse through repeated cycles of charge and discharge, thus resulting in dendritic deposition and growth. For this reason, the amount of charge of the all-solid secondary battery may be about 100 times the initial charge capacity of the anode active material layer or less.

As shown in FIG. 2, the metal layer 23 may be disposed between the anode current collector 21 and the anode active material layer 22. However, embodiments are not limited thereto. For example, as shown in FIG. 3, the metal layer 23 may be formed within the anode active material layer 22. For example, as shown in FIG. 4, the metal layer 23 may be formed both between the anode current collector 21 and the anode active material layer 22, and within the anode active material layer 22.

By charging the all-solid secondary battery, lithium may be deposited in a layer formed between the anode current collector and the anode active material layer, or within the anode active material layer, thus suppressing the formation of voids in the all-solid secondary battery caused by charging and discharging. This may suppress a pressure increase in the all-solid secondary battery caused by charging and discharging, as compared to when deposition of lithium in a layer form does not occur.

As described above, since the anode active material layer includes an anode active material including the amorphous carbon and a metal or metalloid such as gold, platinum, palladium, silicon, silver, aluminum, bismuth, tin, indium, zinc, or a combination thereof, the deposition of lithium on a surface of the anode active material layer adjacent to the solid electrolyte layer may be suppressed when the all-solid secondary battery is overcharged. As a result, the deposition and growth of dendritic metal lithium may be suppressed. Accordingly, a short circuit and reduction in capacity of the all-solid secondary battery may be suppressed, and consequently characteristics of the all-solid secondary battery may be improved.

EXAMPLES

One or more embodiments of the disclosure will now be described in detail with reference to the following examples. However, these examples are only for illustrative purposes and are not intended to limit the scope of the one or more embodiments of the disclosure.

Example 1

1. Manufacture of Samples

First, all-solid secondary battery samples (Nos. 1 to 12) including amorphous carbon as an anode active material layer were manufactured in the following procedure. The all-solid secondary battery samples were manufactured to have the same structure, except that different types of amorphous carbon were used in the anode active material layer.

(1) Formation of Cathode Layer $LiNi_{0.8}Co_{0.15}Al_{0.05}O_2$ (NCA) was prepared as a cathode active material. The prepared cathode active material was coated with $Li_2O\text{-}ZrOz_2$ using a method disclosed in the above-identified non-patent document 1, i.e., Naoki Suzuki et al., Synthesis and Electrochemical Properties of $\overline{I4}$-Type $Li_{1+xx}Zn_{1-x}PS_4$ Solid Electrolyte", Chemistry of Materials, No. 30, 2236-2244, 2018, and is incorporated herein by reference. Argyrodite-type crystalline $Li_6PS_5Cl$ was prepared as a solid electrolyte. A polytetrafluoroethylene (PTFE) binder (Teflon™ binder, available from DuPont) was prepared. Carbon nanofibers (CNF) were prepared as a conducting agent. Next, the prepared cathode active material, solid electrolyte, conducting agent, and binder were mixed together in a weight ratio of about 88:12:2:1 to obtain a mixture. The mixture was elongated into a sheet form to thereby form a cathode active material sheet. The cathode active material sheet was formed to a size of about 1.7 cm² and then pressed on a cathode current collector made of an aluminum foil having a thickness of about 18 μm, to thereby manufacture a cathode layer.

(2) Formation of Anode Layer

An anode layer including, as anode active materials, silver (Ag) particles and amorphous carbon was formed using the following method.

First, 2 g of amorphous carbon (carbon black) and 2 g of silver (Ag) particle having an average particle diameter of about 60 nm (represented as "Ag" in Table 1), were put into a container, and 5.1 g of a N-methyl pyrrolidone (NMP) solution including 7.8 weight % of a binder (#9300, available from KUREHA) was added thereto. Next, this mixture solution was stirred while adding NMP little by little, to prepare a slurry. The prepared slurry was coated on an anode current collector formed as a SUS304 thin film having a thickness of about 10 μm, with a blade coater and then dried in the air at about 80° C. for about 20 minutes, and further dried under vacuum at about 100° C. for about 12 hours to thereby form a laminate. The formed laminate was punched into a size (area) of about 2 square centimeters (cm²), to thereby manufacture an anode layer. The anode layer had a protrusion, which was used as a terminal of an anode. This will be described later. By using such a method, anode layers for use in sample Nos. 1 to 12 were manufactured.

The anode layers for sample Nos. 1 to 12 were formed using one type of amorphous carbon having a nitrogen adsorption specific surface area and a DBP oil absorption as represented in Table 1. The amorphous carbon used to form the anode layers for sample No. 1 to No. 10 was furnace black ("FB" in Table 1). The amorphous carbon used to form the anode layers for sample No. 11 and No. 12 was acetylene black ("AB" in Table 1) and ketjen black ("KB" in Table 1), respectively. Each anode layer was manufactured such that the amorphous carbon in the anode active material layer had a nitrogen adsorption specific surface area, a DBP oil absorption, and an amorphous carbon content as represented in Table 1. In the manufactured all-solid secondary battery samples, it was confirmed that the nitrogen adsorption specific surface area and the DBP oil absorption of the amorphous carbon in each anode active material layer had values as represented in Table 1. The anode layers for sample No. 1 to No. 12 were manufactured such that the amorphous carbon content in each anode active material layer reached a value as represented in Table 1.

(3) Formation of Solid Electrolyte Layer

To the above-described $Li_6PS_5Cl$ solid electrolyte, 1 weight % of a rubber-based binder (A334, available from ZEON) with respect to the mass of the solid electrolyte was added. Next, xylene and diethylbenzene were added to this mixture while stirring, to thereby prepare a slurry. The prepared slurry was coated on a non-woven fabric with a blade coater and then dried at about 40° C. in the air. The thus-obtained laminate was vacuum-dried at about 40° C. for about 12 hours. The dried laminate was punched so as to reach an area of about 2.2 cm², to thereby manufacture a solid electrolyte layer.

(4) Manufacture of all-Solid Secondary Battery

The cathode layer, the solid electrolyte layer and the anode layer formed as described above were stacked on one another in the stated order, and then sealed with a laminate film under vacuum to thereby manufacture an all-solid secondary battery. All-solid secondary battery sample Nos. 1 to 12 were manufactured in this way. Parts of the cathode current collector and the anode current collector were made to protrude out of the laminate film without breaking the vacuum of the battery. The protrusion parts were used as the terminals of the cathode layer and the anode layer. Then, each all-solid secondary battery was subjected to isostatic pressing at about 490 MPa for about 30 minutes. Then, the all-solid secondary battery was disposed between two plates (sheets) of stainless steel, placed on opposite sides of the all-solid secondary battery in the stacking direction, respectively, each having a thickness of about 1 centimeter (cm). In particular, each of the two stainless steel plates had four holes at the same locations, and the all-solid secondary battery was placed within a rectangular space defined by the four holes in each plate. In this state, four bolts were passed through the four holes, respectively, in each of the two stainless steel plates from the outer side thereof. Subsequently, the four bolts were tightened with nuts, respectively, as if pressing the two stainless steel plates from the outer sides, such that a pressure of about 4 MPa was applied to the all-solid secondary battery.

2. Initial Charge Capacity

The initial charge capacity (mAh) of the cathode active material layer and the initial charge capacity (mAh) of the anode active layer of each of the all-solid secondary battery sample Nos. 1 to 12 were measured by the following method.

In particular, all-solid half cells were manufactured using the method described above. Then, CC-CV charging was performed using the cathode active material layer of each cell as a working electrode and Li as a counter electrode, from the open-circuit voltage (OCV) to the upper limit charging voltage (in particular, 4.25V), to thereby measure the initial charge capacity of the cathode active material layer. All-solid half cells using the anode active material layer as a working electrode and Li as a counter electrode were manufactured, and then subjected to CC-CV charging from the open-circuit voltage (OCV) to 0.01V, to thereby measure the initial charge capacity of the anode active material layer. The measured initial charge capacities of the cathode active material layer and the anode active material layer in each sample, and the initial charge capacity ratio thereof, are shown in Table 1.

3. Characteristics Evaluation

A charge-discharge cycle test was performed on each of the all-solid secondary battery sample Nos. 1 to 12 to evaluate characteristics thereof.

(1) Charge-Discharge Cycle Test

A charge-discharge cycle test of each all-solid secondary battery was performed in a 60° C.-thermostatic bath. At the first cycle, each all-solid secondary battery was charged with a constant current of 0.5 mA/cm² until a battery voltage reached 4.25 V, and then with a constant voltage of 4.25 V until a current of 0.2 mA was reached. Afterward, the all-solid secondary battery was discharged with a constant current of 0.5 milliampere per square centimeter (mA/cm²) until a battery voltage reached 2.5 V. At the second and third cycles, each all-solid secondary battery was charged under the same condition as at the first cycle, and then discharged with a constant current of 1.67 mA/cm² and 5.0 mA/cm², respectively, until a battery voltage reached 2.5 V. After the fourth cycle, charge and discharge were performed at a constant current of 0.5 mA/cm², which was repeated for 105 cycles or more, to thereby evaluate battery characteristics of each sample.

(2) Cycle Characteristics

Cycle characteristics of each all-solid secondary battery were evaluated by a capacity retention obtained through the charge-discharge cycle test. In particular, a ratio of the discharge capacity (mAh) at the 105$^{th}$ cycle in the charge-discharge cycle test to the discharge capacity (mAh) at the fifth cycle was defined as the "capacity retention (%)" of the all-solid secondary battery. A sample with a capacity retention of 88% or greater was evaluated as having "excellent cycle characteristics.". The evaluation results of capacity retention of the samples are shown in Table 1.

(3) Discharge Rate Characteristics

Discharge rate characteristics of each all-solid secondary battery were evaluated from a discharge capacity ratio obtained through the charge-discharge cycle test. In particular, a ratio of the discharge capacity (mAh) at the third cycle in the charge-discharge cycle test to the discharge capacity at the second cycle was defined as the "discharge capacity ratio (%)" of the all-solid secondary battery. A sample with a discharge capacity ratio of 92% or greater was evaluated as having "excellent discharge rate characteristics." The evaluation results of discharge capacity ratio of the samples are shown in Table 1.

TABLE 1

| Example | Sample No. | Anode active material | Nitrogen adsorption specific surface area [m²/g] | DBP oil absorption [mL/100 g] | Amorphous carbon amount [weight %] | Cathode initial charge capacity: a [mAh] | Anode initial charge capacity: b [mAh] | Initial charge capacity ratio: b/a | Capacity retention [%] | Discharge capacity ratio [%] |
|---|---|---|---|---|---|---|---|---|---|---|
| Example | 1 | FB + Ag | 54 | 182 | 75 | 26 | 2.4 | 0.092 | 97.1 | 95.3 |
| Example | 2 | FB + Ag | 339 | 193 | 75 | 26 | 2.4 | 0.092 | 97.3 | 95.7 |
| Comparative Example | 3 | FB + Ag | 317 | 67 | 75 | 26 | 2.4 | 0.092 | 78.6 | 93.0 |
| Example | 4 | FB + Ag | 39 | 380 | 75 | 26 | 2.4 | 0.092 | 94.9 | 94.4 |
| Example | 5 | FB + Ag | 52 | 69 | 75 | 26 | 2.4 | 0.092 | 98.6 | 95.7 |
| Example | 6 | FB + Ag | 166 | 172 | 75 | 26 | 2.4 | 0.092 | 95.7 | 94.9 |
| Example | 7 | FB + Ag | 93 | 52 | 75 | 26 | 2.4 | 0.092 | 89.3 | 94.7 |
| Comparative Example | 8 | FB + Ag | 213 | 68 | 75 | 26 | 2.4 | 0.092 | 85.0 | 92.2 |
| Comparative Example | 9 | FB + Ag | 271 | 57 | 75 | 26 | 2.4 | 0.092 | 72.9 | 94.6 |
| Example | 10 | FB + Ag | 24 | 28 | 75 | 26 | 2.4 | 0.092 | 95.0 | 92.5 |
| Example | 11 | AB + Ag | 69 | 175 | 75 | 26 | 2.4 | 0.092 | 92.4 | 95.5 |
| Example | 12 | KB + Ag | 800 | 360 | 75 | 26 | 2.4 | 0.092 | 92.2 | 95.2 |

4. Evaluation

As shown in Table 1, sample Nos. 1, 2, 4 to 7, and 10 to 12 were all-solid secondary batteries according to embodiments satisfying the requirements for the present invention, i.e., containing, with respect to the total mass of the anode active material, 33 weight % or greater of amorphous carbon satisfying (a) a nitrogen adsorption specific surface area greater than 0 m²/g and 100 m²/g or smaller, and/or (b) a DBP oil absorption of 150 mL/100 g or greater. The all-solid secondary battery samples were all found to have a capacity retention of 88% or greater, a discharge capacity ratio of 92% or greater, and excellent cycle characteristics and discharge rate characteristics. Sample Nos. 1, 4, 5, 7, and 11, each included, with respect to the total mass of the anode active material, 33 weight % or greater of amorphous carbon having a nitrogen adsorption specific surface area of 30 m²/g or greater and 100 m²/g or less, and were found to have a higher discharge capacity ratio and improved discharge rate characteristics than sample No. 10 having a nitrogen adsorption specific surface area less than 30 m²/g. Sample Nos. 1, 2, and 6 having a DBP oil absorption of 150 mL/100 g or greater and 200 mL/100 g or less, had both a greater capacity retention and discharge capacity ratio than sample No. 4 having a DBP oil absorption greater than 200 mL/100 g. These results indicate that, when the same type of amorphous carbon is included, the cycle characteristics and discharge rate characteristics may be further improved by including an amorphous carbon having a DBP oil absorption of 200 mL/100 g or less.

Sample Nos. 3, 8, and 9 were all-solid secondary batteries, as comparative examples, and did not satisfy some requirements (a nitrogen adsorption specific surface area and a DBP oil absorption) defined by the present inventive concept. These samples were found to be poor in at least one of cycle characteristics or discharge rate characteristics.

Each of sample Nos. 3, 8, and 9 had a nitrogen adsorption specific surface area greater than 100 m²/g and at the same time a DBP oil absorption smaller than 150 mL/100 g, and had poor cycle characteristics. Without being limited by theory, it is believed that the reason for such poor cycle characteristics may be that, due to the small particle size and small aggregates, the lithium needs to pass beyond the interfaces of multiple grain boundaries and aggregates in order to diffuse into the anode layer. In other words, it is believed that it is difficult for the lithium to reach the interface between the active material and the solid electrolyte during discharge, and thus the amount of lithium isolated within the anode layer increases.

Example 2

In Example 2, all-solid secondary battery sample Nos. 13 to 18, in which the amount of amorphous carbon in the anode active material layer was varied, were manufactured in the following procedure.

In particular, one type of amorphous carbon (furnace black, FB) exhibiting a nitrogen adsorption specific surface area and a DBP oil absorption as shown in Table 2, and silver (Ag) particles (having an average particle diameter of about 60 nm) were prepared as an anode active material. The amorphous carbon and Ag particles were mixed such that an amount of the amorphous carbon with respect to the total mass of the anode active material in the anode active material layer was as shown in Table 2, and the anode layer was manufactured in the same manner as in Example 1.

In the same manner as in Example 1, the cathode layer and the solid electrolyte layer were manufactured and then stacked together with the anode layer to thereby manufacture all-solid secondary battery sample Nos. 13 to 16. Various battery characteristics of the manufactured samples were evaluated in the same manner as in Example 1. The results are shown in Table 2.

TABLE 2

| Example | Sample No. | Anode active material | Nitrogen adsorption specific surface area [m²/g] | DBP oil absorption [mL/100 g] | Amorphous carbon amount [weight %] | Cathode initial charge capacity: a [mAh] | Anode initial charge capacity: b [mAh] | Initial charge capacity ratio: b/a | Capacity retention [%] | Discharge capacity ratio [%] |
|---|---|---|---|---|---|---|---|---|---|---|
| Example | 13 | FB | 54 | 182 | 100 | 26 | 2.4 | 0.092 | — | 86.7 |
| Example | 14 | FB + Ag | 54 | 182 | 95 | 26 | 2.4 | 0.092 | 90.3 | 93.5 |
| Example | 15 | FB + Ag | 54 | 182 | 87.5 | 26 | 2.4 | 0.092 | 97.0 | 95.4 |
| Example | 16 | FB + Ag | 54 | 182 | 67 | 26 | 2.4 | 0.092 | 96.8 | 95.2 |
| Example | 17 | FB + Ag | 54 | 182 | 50 | 26 | 2.4 | 0.092 | 97.2 | 95.1 |
| Example | 18 | FB + Ag | 54 | 182 | 33 | 26 | 2.4 | 0.092 | 93.8 | 94.2 |

As shown in Table 2, sample Nos. 13 to 18 were all-solid secondary batteries according to embodiments satisfying the requirements for the present invention, i.e., containing, with respect to the total mass of the anode active material, 33 weight % or greater of amorphous carbon satisfying at least one of (a) a nitrogen adsorption specific surface area greater than 0 m²/g and 100 m²/g or less, and (b) a DBP oil absorption of 150 mL/100 g or greater. The all-solid secondary battery samples of Nos. 14 to 18 were all found to have a capacity retention of 88% or greater, a discharge capacity ratio of 92% or greater, and excellent cycle characteristics and discharge rate characteristics. Considering the results of samples Nos. 13-18, the amount of amorphous carbon may be about 33 weight % or greater to 95 weight % or less with respect to the total mass of the anode active material, and for example, may be about 33 weight % or greater to 87.5 weight % or less with respect to the total mass of the anode active material.

Example 3

In Example 3, all-solid secondary battery sample Nos. 19 and 20 including amorphous carbon as the anode active material layer were manufactured in the following procedure.

In particular, one type of amorphous carbon (ketjen black, KB) exhibiting a nitrogen adsorption specific surface area and a DBP oil absorption as shown in Table 3, and platinum (Pt) particles (having an average particle diameter of about 1 μm) were prepared as an anode active material. The amorphous carbon and Pt particles were mixed such that an amount of the amorphous carbon with respect to the total mass of the anode active material in the anode active material layer was as shown in Table 3, and the anode layer was manufactured in the same manner as in Example 1.

In the same manner as in Example 1, the cathode layer and the solid electrolyte layer were manufactured and then stacked together with the anode layer to thereby manufacture all-solid secondary battery sample Nos. 19 and 20. Various battery characteristics of the manufactured samples were evaluated in the same manner as in Example 1. The results are shown in Table 3.

TABLE 3

| Example | Sample No. | Anode active material | Nitrogen adsorption specific surface area [m²/g] | DBP oil Absorption [mL/100 g] | Amorphous carbon amount [weight %] | Cathode initial charge capacity: a [mAh] | Anode initial charge capacity: b [mAh] | Initial charge capacity ratio: b/a | Capacity retention [%] | Discharge capacity ratio [%] |
|---|---|---|---|---|---|---|---|---|---|---|
| Example | 19 | KB + Pt | 800 | 360 | 80 | 24 | 1.5 | 0.063 | 95.0 | 95.1 |
| Example | 20 | KB + Pt | 800 | 360 | 50 | 24 | 1.5 | 0.063 | 88.9 | 94.1 |

As shown in Table 3, sample Nos. 19 and 20 were all-solid secondary batteries according to embodiments satisfying the requirements for the present invention, i.e., containing, with respect to the total mass of the anode active material, 33 weight % or greater of amorphous carbon satisfying at least one of (a) a nitrogen adsorption specific surface area of greater than 0 m²/g and 100 m²/g or less, and (b) a DBP oil absorption of 150 mL/100 g or greater. The all-solid secondary battery samples were all found to have a capacity retention of 88% or greater, a discharge capacity ratio of 92% or greater, and excellent cycle characteristics and discharge rate characteristics. From these results, it was confirmed that the advantages of the present inventive concept are obtainable by using a mixture of amorphous carbon and platinum as an anode active material.

As described above, according to the one or more embodiments, an all-solid secondary battery which is excellent in both cycle characteristics and discharge rate characteristics, and a method of charging the all-solid secondary battery are provided.

What is claimed is:

1. An all-solid lithium secondary battery, comprising:
   (1) a cathode comprising a cathode active material layer,
   (2) a solid electrolyte; and
   (3) an anode comprising an anode active material layer, which forms an alloy or a compound with lithium,
   wherein the solid electrolyte is between the cathode and the anode,
   wherein the anode active material layer comprises an anode active material comprising about 33 weight percent to about 95 weight percent of an amorphous carbon, with respect to a total mass of an anode active material in the anode active material layer,
   wherein the amorphous carbon has
      a nitrogen adsorption specific surface area of greater than 0 square meters per gram to about 100 square meters per gram,
      a dibutyl phthalate oil absorption of about 150 milliliters per 100 grams to about 400 milliliters per 100 grams, or a combination thereof, and
   wherein a ratio of an initial charge capacity of the cathode active material layer to an initial charge capacity of the anode active material layer satisfies Inequality 1, $$0.01 < b/a < 0.5 \quad \text{Inequality 1}$$

wherein a is the initial charge capacity of the cathode and b is the initial charge capacity of the anode active material layer.

2. The all-solid lithium secondary battery of claim 1, wherein the amorphous carbon has the nitrogen adsorption specific surface area of about 20 square meters per gram to about 100 square meters per gram.

3. The all-solid lithium secondary battery of claim 1, wherein the amorphous carbon has the nitrogen adsorption specific surface area of about 30 square meters per gram to about 100 square meters per gram.

4. The all-solid lithium secondary battery of claim 1, wherein the amorphous carbon has the dibutyl phthalate oil absorption of about 150 milliliters per 100 grams to 360 milliliters per 100 grams.

5. The all-solid lithium secondary battery of claim 1, wherein the amorphous carbon has the dibutyl phthalate oil absorption of about 150 milliliters per 100 grams to about 200 milliliters per 100 grams.

6. The all-solid lithium secondary battery of claim 1, wherein the anode active material layer further comprises gold, platinum, palladium, silicon, silver, aluminum, bismuth, tin, indium, zinc, or a combination thereof.

7. The all-solid lithium secondary battery of claim 1, wherein the anode active material layer comprises about 33 weight percent to about 87.5 weight percent of the amorphous carbon, with respect to the total mass of the anode active material.

8. The all-solid lithium secondary battery of claim 1, wherein the amorphous carbon is carbon black.

9. The all-solid lithium secondary battery of claim 8, wherein the carbon black is furnace black, acetylene black, ketjen black, or a combination thereof.

10. The all-solid lithium secondary battery of claim 1, wherein the anode further comprises a binder.

11. The all-solid lithium secondary battery of claim 1, wherein a thickness of the anode active material layer is about 50% or less of a thickness of the cathode active material layer, wherein the thickness of the anode active material layer is about 0.1 micrometer to about 20 micrometers.

12. The all-solid lithium secondary battery of claim 1, wherein the anode further comprises an anode current collector and a film on the anode current collector, wherein the film comprises an element which is alloyable with lithium, and the film is disposed between the anode current collector and the anode active material layer.

13. The all-solid lithium secondary battery of claim 12, wherein the film has a thickness of about 1 nanometer to about 800 nanometers.

14. The all-solid lithium secondary battery of claim 1, wherein the anode further comprises an anode current collector and a metal layer, wherein the metal layer is disposed between the anode current collector and the solid electrolyte, and wherein the metal layer comprises lithium metal.

15. The all-solid lithium secondary battery of claim 14, wherein the metal layer is disposed between the anode current collector and the anode active material layer, or is disposed inside of the anode active material layer.

16. The all-solid lithium secondary battery of claim 1, wherein the anode further comprises an anode current collector, wherein the anode current collector, the anode active material layer, and a region between the anode current collector and the solid electrolyte do not comprise lithium metal or a lithium alloy in an initial state or a fully discharged state of the all-solid lithium secondary battery.

17. The all-solid lithium secondary battery of claim 1, wherein the solid electrolyte comprises a sulfide solid electrolyte.

18. The all-solid lithium secondary battery of claim 17, wherein the sulfide solid electrolyte comprises $Li_2S$—$P_2S_5$, $Li_2S$—$P_2S_5$—LiX wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are each independently a positive number, and Z is Ge, Zn, or Ga, $Li_2S$—$GeS_2$, $Li_2S$—$SiS_2$—$Li_3PO_4$, $Li_2S$—$SiS_2$-$Li_pMO_q$, wherein p and q are each independently a positive number, and M is P, Si, Ge, B, Al, Ga, or In, or a combination thereof.

19. The all-solid lithium secondary battery of claim 17, wherein the sulfide solid electrolyte comprises $Li_7P_3S_{11}$, $Li_7PS_6$, $Li_4P_2Se$, $Li_3PS_6$, $Li_3PS_4$, $Li_2P_2S_6$, or a combination thereof.

20. The all-solid lithium secondary battery of claim 17, wherein the sulfide solid electrolyte comprises an argyrodite-type solid electrolyte represented by Formula 1:

$$Li^+{}_{12-n-x}A^{n+}X^{2-}{}_{6-x}Y'^-{}_x \qquad \text{Formula 1}$$

wherein, in Formula 1,
A is P, As, Ge, Ga, Sb, Si, Sn, Al, In, Ti, V, Nb, or Ta,
X is S, Se, or Te,
Y' is Cl, Br, I, F, CN, OCN, SCN, or $N_3$,
n is a valence of A, and
$0 \leq x \leq 2$.

21. The all-solid lithium secondary battery of claim 20, wherein the argyrodite-type solid electrolyte comprises $Li_{7-x}PS_{6-x}Cl_x$ wherein $0 \leq x \leq 2$, $Li_{7-x}PS_{6-x}Br_x$ wherein $0 \leq x \leq 2$, $Li_{7-x}PS_{6-x}I_x$ wherein $0 \leq x \leq 2$, or a combination thereof.

22. The all-solid lithium secondary battery of claim 1, wherein the solid electrolyte has an elastic modulus of about 15 gigapascals to about 35 gigapascals.

23. The all-solid lithium secondary battery of claim 1, wherein
the cathode further comprises a cathode current collector and the anode further comprises an anode current collector,
wherein the cathode current collector, the cathode active material layer, the solid electrolyte, the anode active material layer, and the anode current collector are disposed in the stated order, and
the anode active material layer comprises the amorphous carbon and a metal, a metalloid, or a combination thereof.

24. The all-solid lithium secondary battery of claim 23, wherein the anode current collector comprises nickel, stainless steel, titanium, iron, cobalt, copper, or a combination thereof.

25. The all-solid lithium secondary battery of claim 1, further comprising an anode current collector disposed on a side of the anode active material layer opposite to the solid electrolyte, wherein the anode current collector is a film comprising stainless steel.

26. The all-solid lithium secondary battery of claim 1, further comprising
a cathode current collector, an anode current collector, and a metal layer,
wherein the cathode current collector, the cathode active material layer, the solid electrolyte, the anode active material layer, the metal layer, and the anode current collector are disposed in the stated order,
wherein the anode active material layer comprises the amorphous carbon and a metal, a metalloid, or a combination thereof, as the anode active material, and the metal layer comprises lithium metal.

27. The all-solid lithium secondary battery of claim 1, wherein the cathode, the solid electrolyte, and the anode are sealed in a laminate film.

28. An all-solid lithium secondary battery, comprising:
a cathode comprising a cathode active material layer;
an anode comprising an anode active material layer,
a solid electrolyte between the cathode and the anode, and comprising an argyrodite-type solid electrolyte represented by Formula 1

$$Li^+{}_{12-n-x}A^{n+}X^{2-}{}_{6-x}Y'^-{}_x \qquad \text{Formula 1}$$

wherein, in Formula 1,
A is P, As, Ge, Ga, Sb, Si, Sn, Al, In, Ti, V, Nb, or Ta,
X is S, Se, or Te,
Y' is Cl, Br, I, F, CN, OCN, SCN, or $N_3$,
n is a valence of A,
$0 \leq x \leq 2$, and
wherein the anode active material layer comprises an anode active material comprising amorphous carbon and a metal, a metalloid, or a combination thereof,
wherein the amorphous carbon is present in an amount of about 33 weight percent to about 95 weight percent with respect to a total mass of an anode active material in the anode active material layer,
wherein the metal, metalloid, or combination thereof is gold, platinum, palladium, silicon, silver, aluminum, bismuth, tin, indium, zinc, or a combination thereof,
wherein the amorphous carbon has
a nitrogen adsorption specific surface area of greater than 0 to 100 square meters per gram,
a dibutyl phthalate oil absorption of about 150 milliliters per 100 grams to about 400 milliliters per 100 grams, or
a combination thereof, and
wherein a ratio of an initial charge capacity of the cathode active material layer to an initial charge capacity of the anode active material layer satisfies Inequality 1

$$0.01 < b/a < 0.5 \qquad \text{Inequality 1}$$

wherein a is the initial charge capacity of the cathode active material layer and b is the initial charge capacity of the anode active material layer.

29. A method of manufacturing the all-solid lithium secondary battery according to claim 1, the method comprising:
providing a solid electrolyte between the cathode and the anode; and
pressing the cathode, the solid electrolyte, and the anode to manufacture the all-solid lithium secondary battery of claim 1.

30. The method of claim 29, wherein the pressing is isostatic pressing at a pressure of about 300 megapascals to about 1000 megapascals.

31. A method of using the all-solid lithium secondary battery according to claim 1, the method comprising:
charging and discharging the all-solid lithium secondary battery of claim 1, while pressing the all-solid lithium secondary battery between two plates.

32. The method of claim 31, wherein the pressing comprises applying a pressure of about 0.5 megapascals to about 10 megapascals.

33. A method of charging an all-solid lithium secondary battery, the method comprising:
    charging the all-solid lithium secondary battery according to claim 1 such that an amount of a charge of the all-solid secondary battery exceeds an initial charge capacity of the anode active material layer.

34. The method of claim 33, wherein the amount of the charge is about two times to about 100 times the initial charge capacity of the anode active material layer.

* * * * *